(12) United States Patent
Faris et al.

(10) Patent No.: US 12,311,359 B2
(45) Date of Patent: May 27, 2025

(54) METHOD AND DEVICE FOR FLOW CONTROL

(71) Applicant: Biotage AB, Uppsala (SE)

(72) Inventors: Adam Faris, Uppsala (SE); Johan Asplund, Uppsala (SE); Juha Esala, Vattholma (SE); Love Amcoff, Uppsala (SE)

(73) Assignee: BIOTAGE AB, Uppsala (SE)

( * ) Notice: Subject to any disclaimer, the term of this patent is extended or adjusted under 35 U.S.C. 154(b) by 287 days.

(21) Appl. No.: 15/774,766

(22) PCT Filed: Dec. 12, 2016

(86) PCT No.: PCT/EP2016/080543
§ 371 (c)(1),
(2) Date: May 9, 2018

(87) PCT Pub. No.: WO2017/098032
PCT Pub. Date: Jun. 15, 2017

(65) Prior Publication Data
US 2018/0326414 A1  Nov. 15, 2018

(30) Foreign Application Priority Data
Dec. 11, 2015 (EP) .................................. 15199601

(51) Int. Cl.
*B01L 3/00* (2006.01)
*B01L 9/06* (2006.01)
(Continued)

(52) U.S. Cl.
CPC ......... *B01L 3/50255* (2013.01); *B01L 3/5027* (2013.01); *B01L 9/06* (2013.01);
(Continued)

(58) Field of Classification Search
CPC .................. B01L 2400/082; B01L 3/0206
(Continued)

(56) References Cited

U.S. PATENT DOCUMENTS 5,260,028 A   11/1993  Astle
5,660,792 A   8/1997   Koike
(Continued)

FOREIGN PATENT DOCUMENTS

JP   H07-145874 A   6/1995
WO   WO-2007/016678 A2   2/2007
WO   WO-2014/100859 A1   7/2014

OTHER PUBLICATIONS

International Search Report PCT/ISA/210 for International Application No. PCT/EP2016/080543 Dated Dec. 12, 2016.
(Continued)

*Primary Examiner* — Natalia Levkovich
(74) *Attorney, Agent, or Firm* — Harness, Dickey & Pierce, P.L.C.

(57) ABSTRACT

A flow control device, a system and a method are disclosed. The flow control device comprises a displaceable means (101) having a direction of displacement and being displaceable between a first position and a second position. The flow control device further comprises a body (110) comprising a first cavity (102) in fluid contact with a first side of the displaceable means (102) forming a first volume. The first cavity further comprising a first inlet (103), a primary outlet (104) with a primary flow resistance and arranged essentially parallel with the displacement direction, wherein the primary outlet comprises an inlet opening (105) facing the displaceable means at a first distance (106) from the displaceable means in the direction of displacement, a secondary outlet (107) with a secondary flow resistance, wherein the displaceable means is displaceable between a first position and a second position. In the first position, a first fluid
(Continued)

path (108) between the first inlet (103) and the primary outlet (104) is provided, and a second flow path (109) between the inlet (103) and the secondary outlet (107) is provided; In the second position, the displaceable means is displaced at least the first distance and close the inlet opening (105) of the primary outlet, whereby the inlet opening (105) is blocked, and the second fluid path (109) between the first inlet (103) and the secondary outlet (107) is maintained.

15 Claims, 7 Drawing Sheets

(51) Int. Cl.
*F16K 27/00* (2006.01)
*F16K 27/02* (2006.01)
*B01L 3/02* (2006.01)
*G01N 1/40* (2006.01)
*G01N 35/10* (2006.01)

(52) U.S. Cl.
CPC ........ *F16K 27/003* (2013.01); *F16K 27/0236* (2013.01); *F16K 27/0263* (2013.01); *B01J 2219/00306* (2013.01); *B01J 2219/00389* (2013.01); *B01J 2219/00423* (2013.01); *B01L 3/021* (2013.01); *B01L 2300/04* (2013.01); *B01L 2300/0829* (2013.01); *B01L 2400/0487* (2013.01); *B01L 2400/0633* (2013.01); *B01L 2400/082* (2013.01); *G01N 1/405* (2013.01); *G01N 35/1097* (2013.01)

(58) Field of Classification Search
USPC .......................................... 436/180; 422/502
See application file for complete search history.

(56) References Cited

U.S. PATENT DOCUMENTS

| | | | |
|---|---|---|---|
| 6,614,228 | B2 | 9/2003 | Hofmann et al. |
| 2006/0019407 | A1 | 1/2006 | Fulton et al. |
| 2012/0077260 | A1 | 3/2012 | Sharon et al. |
| 2013/0330249 | A1 | 12/2013 | Dawes et al. |
| 2014/0273180 | A1* | 9/2014 | Griswold .................. B01L 3/52 |
| | | | 435/285.1 |

OTHER PUBLICATIONS

Written Opinion of the International Searching Authority PCT/ISA/237 for International Application No. PCT/EP2016/080543 Dated Dec. 12, 2016.

* cited by examiner

METHOD AND DEVICE FOR FLOW CONTROL

CROSS-REFERENCE TO RELATED APPLICATIONS

This application is a national phase under 35 U.S.C. § 371 of PCT International Application No. PCT/EP2016/080543 which has an International filing date of Dec. 12, 2016, which claims priority to European Application No. 15199601.4, filed Dec. 11, 2015, the entire contents of each of which are hereby incorporated by reference.

The present invention relates to a flow control device and more particularly to a flow control device for an automated sample preparation system, a system, as well as a method therefore.

BACKGROUND OF THE INVENTION

The present invention relates to the area of sample preparation, wherein liquid samples are processed in order to increase purity and/or other conditions to make it suitable for subsequent analysis. The samples may be biological samples, such as samples obtained from veterinary or human patients or other test objects; or samples originating from the biological manufacture of target compounds. Alternatively, the samples may originate from other sources, such as organic synthesis. The main object in common to commonly used sample prep methods is to reduce the complexity of the sample composition.

In some areas of laboratory testing which need a high throughput, high density carriers for test-tubes are commonly used. Such high density carriers are commonly denoted well-plates or cartridges and exists in various sizes, such as for example 24, or 96-well-plates. The number indicates the number of test-tubes. In for example solid phase extraction (SPE) it is common to have a sample with a target molecule in a first liquid. In SPE it is common to have test-tubes which are open both in a proximal end and in a distal end with a separation media arranged there between. Upon passing the sample through the separation media retention of the target molecule occurs in the separation media. In some applications, it might be desirable to dry the separation media by flowing a gas through the test-tube and the separation media after the step of passing the sample.

In some systems the guiding of the first solvent is performed by applying a pressure to one end of the cartridge by means of a gas. This pressure is often supplied via a flow path with a high flow resistance in order to minimize the effect of possible leakages in the connection to the test-tube of the carrier between neighbouring test-tubes.

A step of drying may be performed by means of flowing a gas at an overpressure through the cartridge at higher flow rate compared to the flow rate of the first solvent. Such increased gas flow will improve the drying of the residual first solvent.

Further, vacuum may be is used to draw liquid through one or more test-tube, and the drying may be performed by blowing a gas through the test-tube. In some cases the maximum pressure obtained is not sufficient for efficient drying, and sometimes stability problems are experienced.

WO 2007/016678 describes a fluid supply system and an apparatus developed for the prevention of blow outs during subsea drilling. More specifically, WO 2007/016678 provides an apparatus which provides redundancy to fluid flow components via alternative flow routes. In one embodiment, the described apparatus includes an intervention shuttle valve comprises a housing of a generally cylindrical cavity, a primary inlet, a secondary inlet, a generally cylindrical spool-type shuttle and an outlet. In use, the flow is utilized to force the shuttle into a normal or an actuated position. In the normal position, a flow path is provided from a primary inlet, which is arranged for flow perpendicular to the direction of movement of the shuttle, to the outlet, which is arranged in parallel with the primary inlet but at the opposite side of the housing. In its actuated position, fluid enters a secondary inlet arranged for flow parallel to the direction of movement of the shuttle, to the same outlet. Thus, there is only one opening in the WO 2007/016678 housing which allows for flow parallel to the direction of movement of the shuttle.

SUMMARY OF THE INVENTION

In one aspect, the present invention provides a flow control device. In an advantageous embodiment of the invention, a set of two or more such devices are arranged and used together. The flow control device of the invention comprises a displaceable means having a direction of displacement and being displaceable between a first position and a second position. The flow control device comprises a body comprising a first cavity in fluid contact with a first side of the displaceable means forming a first volume. The first cavity further comprising a first inlet and a primary outlet arranged essentially in parallel with the displacement direction. The primary outlet comprises an inlet opening facing the displaceable means at a first distance from the displaceable means in the direction of displacement. The first cavity further comprises a secondary outlet arranged essentially in parallel with the displacement direction. The primary and the secondary outlets may advantageously have different flow resistances, such as obtained e.g. by having different dimensions or by any other means, e.g. as discussed in more detail below.

The displaceable means is displaceable between at least a first position and a second position. In the first position, a first fluid path between the first inlet and the primary outlet is provided, and a second flow path between the inlet and the secondary outlet is provided. In the second position, the displaceable means is displaced at least the first distance and close the inlet opening of the primary outlet, whereby the inlet opening is substantially blocked, and the second fluid path between the first inlet and the secondary outlet is maintained.

In another aspect, the present invention provides a system comprising two or more of the above-described flow devices according to the invention.

Thus, the system according to the invention may comprise a flow control device, which comprises a displaceable means having a direction of displacement and being displaceable between a first position and a second position. The flow control device further comprises a body comprising a first cavity in fluid contact with a first side of the displaceable means forming a first volume. The first cavity further comprising a first inlet, a primary outlet with a primary flow resistance and being arranged essentially parallel with the displacement direction. The primary outlet comprises an inlet opening facing the displaceable means at a first distance from the displaceable means in the direction of displacement. The first cavity further comprises a secondary outlet with a secondary flow resistance. The displaceable means is displaceable between a first position and a second position. In the first position, a first fluid path between the first inlet and the primary outlet is provided, and a second flow path between the inlet and the secondary outlet is provided. In the second position, the displaceable means is displaced at least the first distance and close the inlet opening of the primary outlet, whereby the inlet opening is blocked, and the second fluid path between the first inlet and the secondary outlet is maintained. An array of test-tubes arranged on a carrier such that a proximal open end of each test-tube are in a fluid tight connection with the flow control device such that corresponding primary flow path and secondary flow path of the flow control device opens into the proximal open end of each test-tube. The system comprises a control means for the displaceable means of the flow control device and a manoeuvrable fluid source connected to the first inlet for supplying a first fluid.

In yet another aspect, the present invention provides a method for separating at least one target molecule from a first liquid. The method comprises providing a flow control device having a primary flow path and a secondary flow path, wherein the primary flow path has a lower flow resistance compared to the secondary flow path. The method further comprises providing at least two test-tubes packed with separation media and arranged in a fixed relationship to each other in an array, wherein each test-tube has been provided the first liquid with the at least one target molecule. The method further comprises bring the flow control device in fluid tight connection to the test-tubes in the array, such that each primary flow path and secondary flow path is in fluid tight connection to a corresponding test-tube in the array. The method further comprises passing the first liquid through the test tube and the separation media by means of a pressure from a first fluid supplied through the secondary flow path to each test-tube in the array, whereby retention of the target molecule in the media is allowed. The method further comprises removing the residual first solvent from the test tube and the media by means of the first fluid supplied through the primary flow path.

The terms "test-tube", and "carrier" as used herein are to be interpreted in a broad sense, in which the test-tube should be interpreted as a container for a liquid sample. The carrier should be interpreted as a holder for an array of test-tubes.

A more complete understanding of the invention, as well as further features and advantageous thereof, will be obtained by reference to the following detailed description and drawings.

DETAILED DESCRIPTION OF THE INVENTION

The following description is for illustration and exemplification of the invention only and is not intended to limit the invention to the specific embodiments described.

All references cited herein, including patents and patent applications are incorporated by reference in their entirety for illustrative purposes only.

Unless defined otherwise, technical and scientific terms have the same meaning as commonly understood by one of ordinary skill in the art to which this invention belongs.

The meaning of the terms test tube and carrier as used herein are as follows.

The test-tube is a container for a liquid sample. The test-tube may contain an open proximal end and an open distal end.

The carrier is a structure provided for holding a plurality of test-tubes in an array formation. Common arrangements are an array for 24 test tubes (4 rows, 6 columns) and array for 96 test-tubes (8 rows, 12 columns). In some carriers the test tubes may be integrally formed as tubes, vial, columns or wells. In the area of sample preparation, a carrier is commonly known as a "rack".

Figure 1:
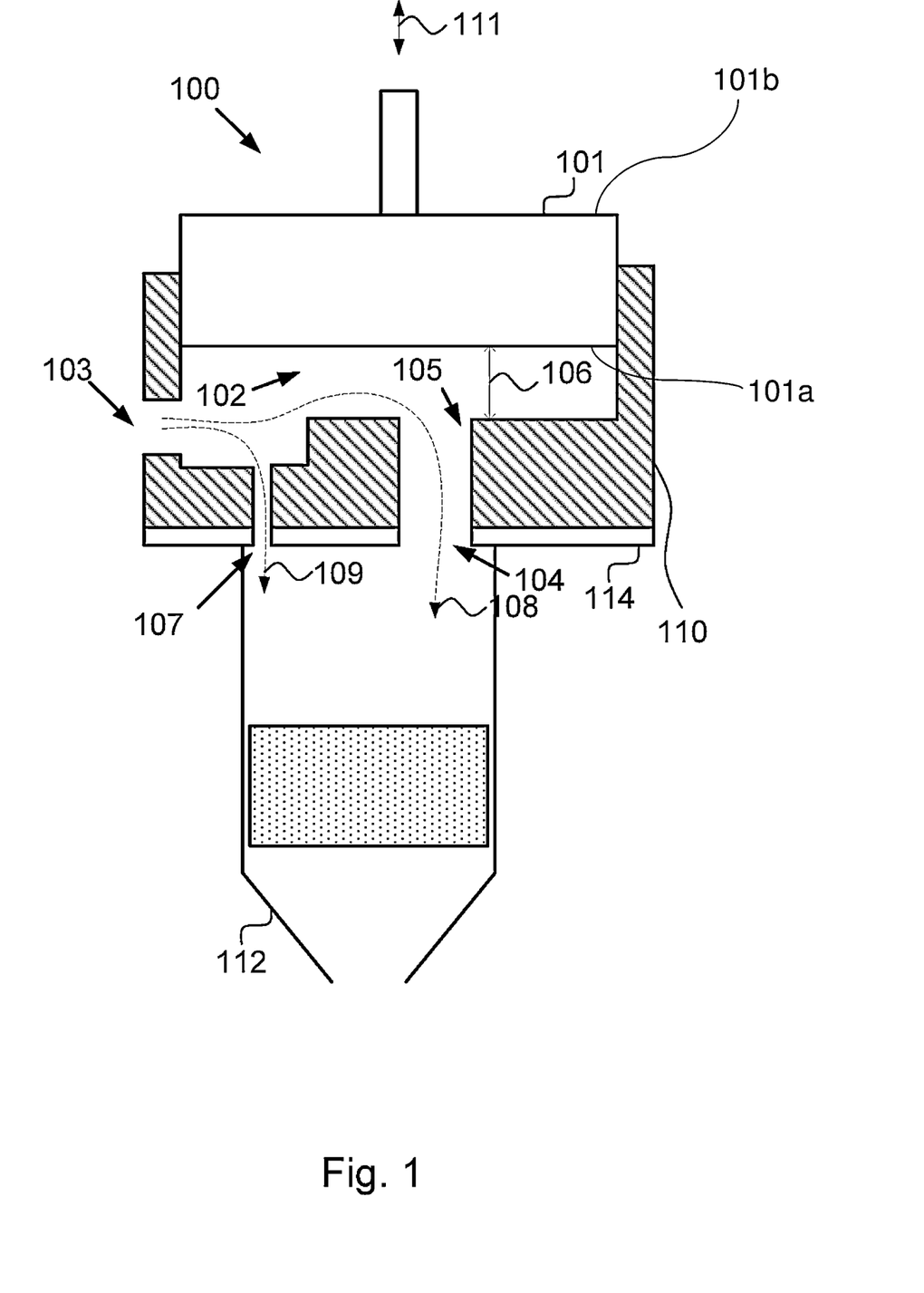
FIG. 1 is a schematic view of an embodiment of a flow control device according to the present invention.

In order to describe the invention a simplified geometry of a flow control device, generally designated 100, is disclosed in FIG. 1. The flow control device 100 comprises a displaceable means 101 having a direction of movement 111 and being moveable between a first position and a second position. In this simplified geometry the displaceable element is a piston.

The flow control device further comprises a body 110 configured to be connected to a proximal end of a test-tube 112 such that a fluid tight seal is achieved. In order to assist the forming of the fluid tight seal, a seal 114 is arranged between the body 110 and the test-tube 112. The body 110 further comprises a first cavity 102 in fluid contact with a first side 101a of the displaceable means 101 forming a first volume.

The first cavity 102 comprises a first inlet 103, for a fluid such as compressed gas, a primary outlet 104 with a primary flow resistance being arranged essentially parallel with the direction of movement 111.

The primary outlet 104 comprises an inlet opening 105 facing the displaceable means at a first distance 106 from the displaceable means 101 in the direction of movement 111.

The first cavity 102 further comprises a secondary outlet 107 with a secondary flow resistance.

The displaceable means 101 is displaceable between a first position and a second position. In the first position, a first fluid path 108 between the first inlet 103 and the primary outlet 104 is provided, and a second flow path 109 between the inlet 103 and the secondary outlet 107 is provided.

Figure 2:
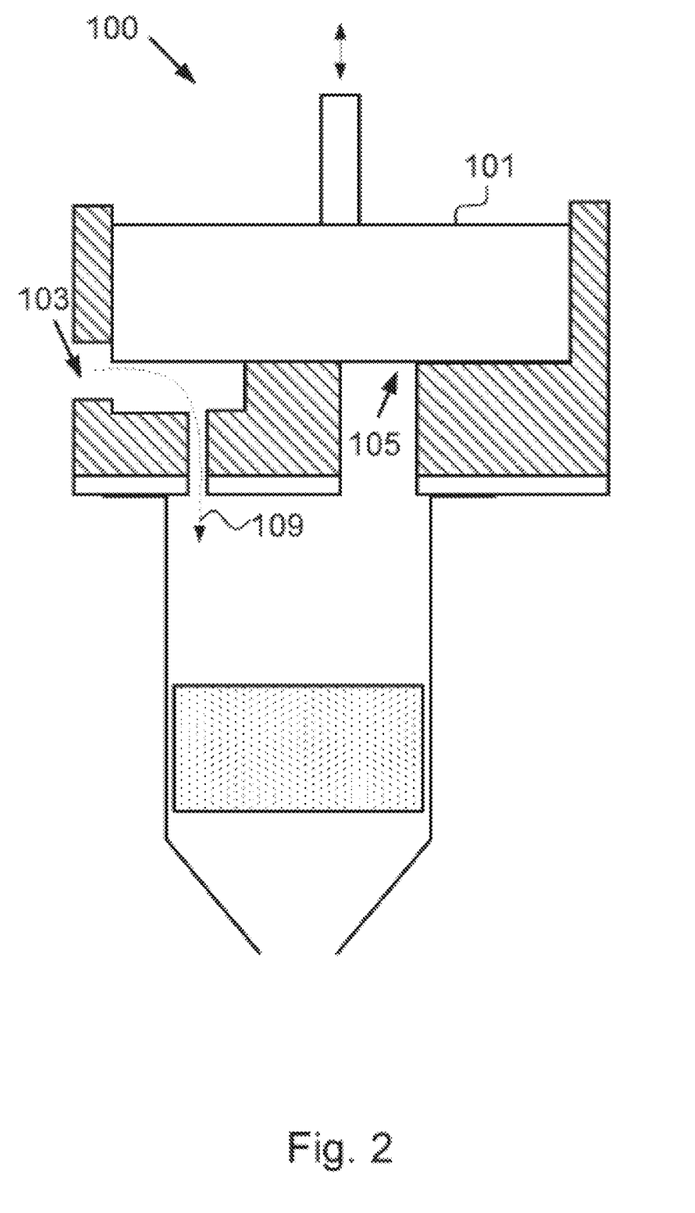
FIG. 2 is a schematic view of an embodiment of a flow control device according to the present invention in a second position.

In the second position, illustrated in FIG. 2, the displaceable means is displaced at least the first distance 106 and closes the inlet opening 105 of the primary outlet, whereby the inlet opening 105 is blocked, and the second fluid path 109 between the first inlet 103 and the secondary outlet 107 is maintained.

In embodiments which use a carrier with an array of test-tubes, the flow control device comprises primary flow paths and secondary flow paths arranged in a corresponding geometry. Such a flow control device is disclosed in FIG. 3, and is generally designated 300. The flow control device 300 is disclosed in a perspective view. The flow control device 300 comprises a lid 301 with a cavity 401 (shown in FIG. 4) forming a second volume, and the displaceable element 101 is a membrane 302 arranged between the lid 301 and the body 110-1, wherein the second volume is in fluid contact with a second side 302b of the displaceable element (opposite to a first side 302a of the displaceable element), the cavity further comprises a second inlet 307. The first position of the displaceable element corresponds to a flat state of the membrane, and the second position of the displaceable element corresponds to a deflected state of the membrane.

Figure 3:
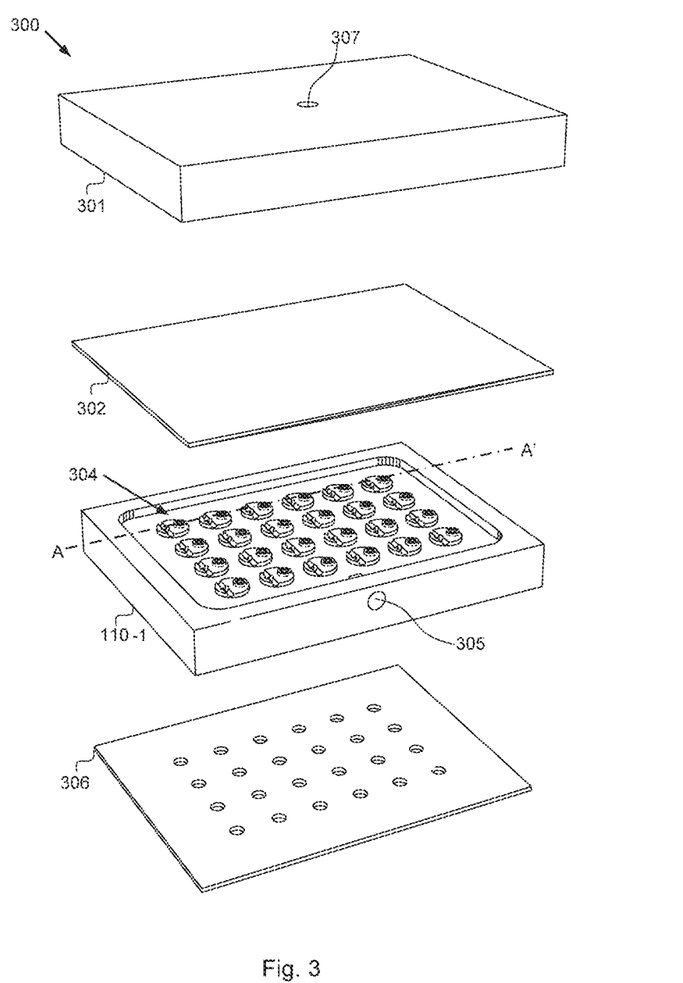
FIG. 3 is perspective view of an embodiment of a flow control device according to the present invention.

The primary flow path and the secondary flow path may be provided according to the invention in a housing, generally designated 304.

The flow control device 300 may comprise a lid 301 with a cavity 401 (shown in FIG. 4) forming a second volume, and the displaceable element 101 arranged between the lid 301 and the body 110-1. The second volume is in fluid contact with a second side of the displaceable element, the cavity further comprises a second inlet 307.

The displaceable element may be a piston which is moved to the second position, i.e. to the second inlet 307. As the skilled person will understand, the movement of the displaceable element may be obtained with either of many available alternative techniques, such as using pneumatics.

Figure 4:
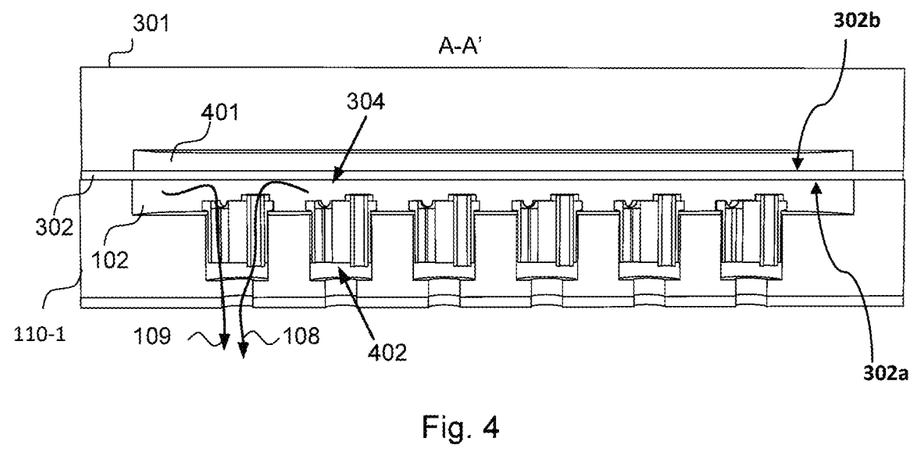
FIG. 4 is a cut open perspective view along A-A' in FIG. 3 of a flow control device according to the present invention.

In order to further describe the illustrative flow control device 300 a cut-line A-A' of the same is shown in FIG. 4

In FIG. 4 a flow control device is shown in a cut open perspective view. In this view a row of housings 304 are shown cut-open. Each housing 304 has the primary flow path 108 and the secondary flow path arranged therein. The housings 304 are arranged in holes 402 of the body 110-1. The holes have a first bore with a dimension configured to receive the housing 304, the first bore ends in a smaller second bore configured to correspond to a test-tube of a desired size. From this illustrative view, the general function of the flow control device according to the invention is easily explained. By increasing the pressure in the second volume i.e. the cavity 401 the membrane 302 is pressed towards the devices and thereby closes the inlet opening of the primary outlet, while the secondary flow passage is maintained. If the flow device according to the invention comprises flow restricting means, the housing may be denoted "restrictor housing".

The holes 402 may be through holes with a dimension suitable for receiving the restrictor housings 304.

In the flow control device of the invention, the body may comprise at least two pairs of a secondary outlet and a primary outlet, wherein each pair of the secondary outlet and the primary outlet is configured to be connected to an opening of a test-tube.

Figure 5:
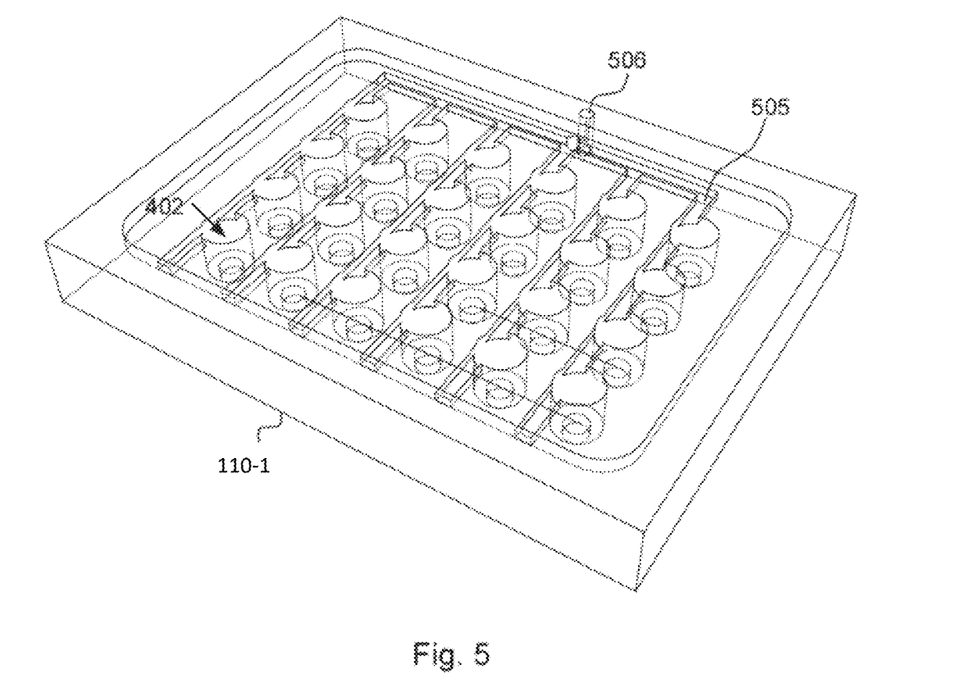
FIG. 5 is a perspective view of an embodiment of a body of a flow control device according to the present invention.

The housings may be spaced apart a distance such that when the membrane 302 is in the second position, the secondary flow path may be interrupted by the membrane. In such cases it might be useful to arrange flow channels in the body which extends from the inlet 305 to each restrictor housing 304. Such flow channels might be formed by grooves in the body 110-1. This is shown in FIG. 5 as grooves 505 extending from the inlet 506 to each hole 402. In this embodiment the inlet is arranged such that the inlet 506 will extend through the frame of the lid to the top of the lid.

Figure 6:
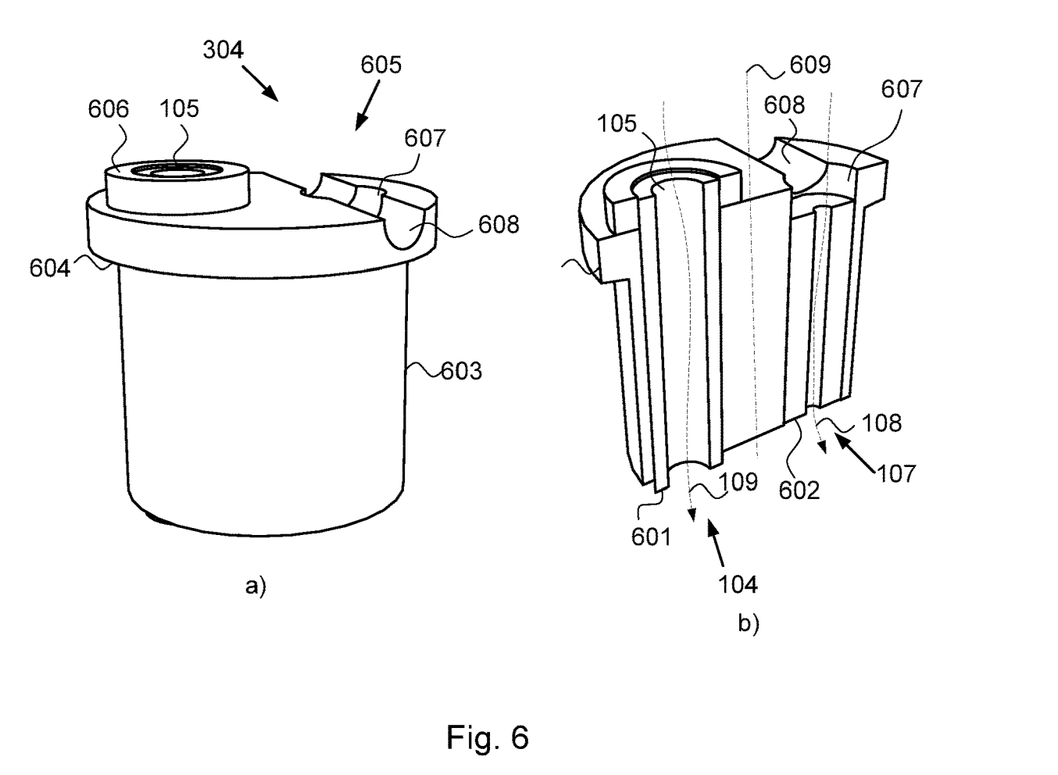
FIG. 6 is a perspective view of a restrictor housing according to the present invention.

Now with reference made to FIG. 6 an embodiment of the restrictor housing 304 will be described, as described above the primary outlet 104 and the primary flow path 109 are arranged in the restrictor housing 304. Furthermore, the secondary outlet 107 and the secondary flow path 108 are also arranged in the restrictor housing 304.

This means that the restrictor housing 304 is easily replaceable, and may be formed by injection moulding in a plastic material.

The restrictor housing 304 comprises an elongated body 603, such as a cylinder with the primary flow path 109 and the secondary flow path 108 extending along the longitudinal axis 609 of the elongated body. In a preferred embodiment, the secondary flow path is configured for a flow of 10 ml/min, and the primary flow path is configured for a flow of 600 ml/min.

The restrictor housing comprises a flange 604 arranged at a proximal end 605 of the elongated body 603. The flange 604 functions as a stop for the restrictor housing. The elongated body at the proximal end 605 further comprises a seat 606 for the inlet opening of the primary outlet. The seat is configured to provide a seal when engaged with the displaceable element in the second position of the displaceable element. The seat is further configured to provide the primary flow path through the primary outlet when the displaceable element is in the first position.

The restrictor housing further comprises an inlet 607 for the secondary outlet 107 arranged at a longitudinal distance from the seat, wherein the inlet 607 is open both in the first position and the second position of the displaceable element.

The seat 606 may comprise a planar surface with a normal essentially parallel to the longitudinal axis 609 of the elongated body 603.

The inlet 607 for the secondary outlet 107 may comprise a groove 608 in the proximal end surface of the elongated body, wherein the groove is configured to provide an additional fluid path to the secondary outlet 107 from the inlet 607 when the displaceable element is in the second position.

Figure 7:
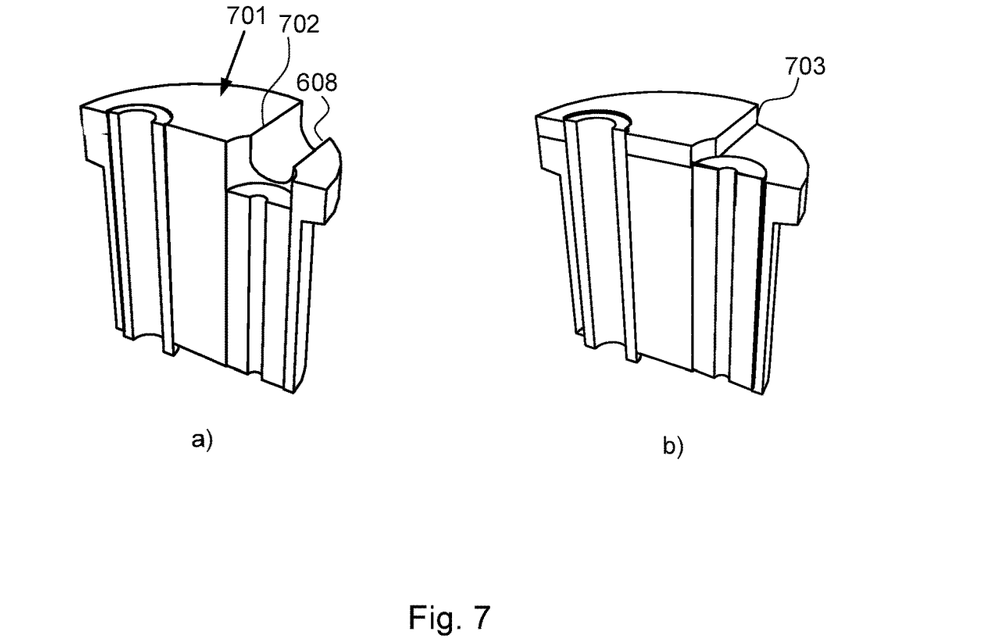
FIG. 7 is a cut open perspective view of a restrictor housing according to the present invention.

In FIG. 7 additional embodiments of the restrictor housing are disclosed. In FIG. 7a) an embodiment of a restrictor housing having a seat 701 that covers the proximal end surface of the restrictor housing to a side wall 702 of the groove 608.

In FIG. 7b) an embodiment of the restrictor housing is disclosed. The proximal end of the restrictor housing comprises a step 703, which causes the inlet 105 of the primary flow path to be arranged at a larger longitudinal distance in the direction of the longitudinal axis 609 compared to the inlet 607 of the secondary flow path 108. Whereby, the inlet 105 and the inlet 607 are laterally displaced.

In the above discussed embodiments, the restrictor housings comprises primary and secondary flow paths formed by tubes with through holes that defines the flow resistance of each path. Other types of flow restrictors may also be used such as amorphous material for example.

Figure 8:
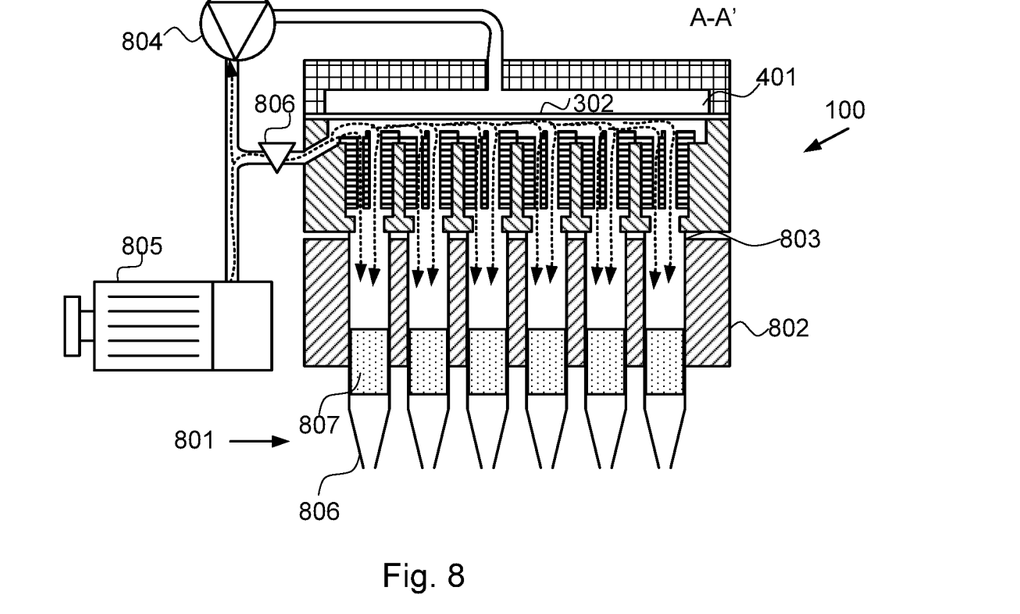
FIG. 8 is a schematic view of a system according to the present invention.

Now with reference made to FIG. 8 a system, generally designated 800, according to an embodiment of the invention will be disclosed. The system comprises a flow control device 300 according to embodiments of the present invention. The system 800 comprises an array of test-tubes 801 arranged on a carrier 802 such that a proximal open end 803 of the test-tube are in a fluid tight connection with the flow control device 100 such that corresponding primary flow path and secondary flow path of the flow control device opens into the proximal open end of each test-tube. The system further comprises control means 804 for the displaceable means of the flow control device and a manoeuvrable fluid source 805 connected to the first inlet 103 for supplying a first fluid.

The manoeuvrable fluid source 805 may be any suitable gas source, such as a nitrogen gas source. In an advantageous embodiment, the displaceable means comprises a membrane, which is moved by nitrogen gas. The nitrogen supplied to the inlet of the fluid control device may have a reduced pressure compared to the pressure in the first volume, caused by a pressure regulator 806.

In one embodiment the pressure of the gas supplied to the inlet is adjustable from 0 bar up to 5 bar.

In one embodiment, the pressure in the first volume is larger than the pressure of the gas supplied to the inlet in the second position.

In other embodiments the manoeuvrable fluid source may be a compressor, such as an air compressor.

Now with reference made to FIG. 8 again, the operation of the system 800, when the membrane of the flow control device is in its first position, will be discussed. In FIG. 8 the control means 804 is closed whereby the cavity 401 is not supplied with a fluid flow from the fluid source 805. This causes the membrane 302 to be in a flat state or to be deflected into the cavity 401. The manoeuvrable fluid source 805 supplies compressed air to the first inlet 103 of the flow control device. Since the membrane is not engaging the inlet 105 of the primary flow path both the primary flow path and the secondary flow path are open for fluid flow to a test-tube 806 of the array 801. When both the primary flow path and the secondary flow path are open for fluid flow a high flow of the fluid supplied to the first inlet is flowing through each test-tube 806 of the array 801. This causes an effective drying of a sorbent 807 arranged in each test-tube 806 of the array 801.

Figure 9:
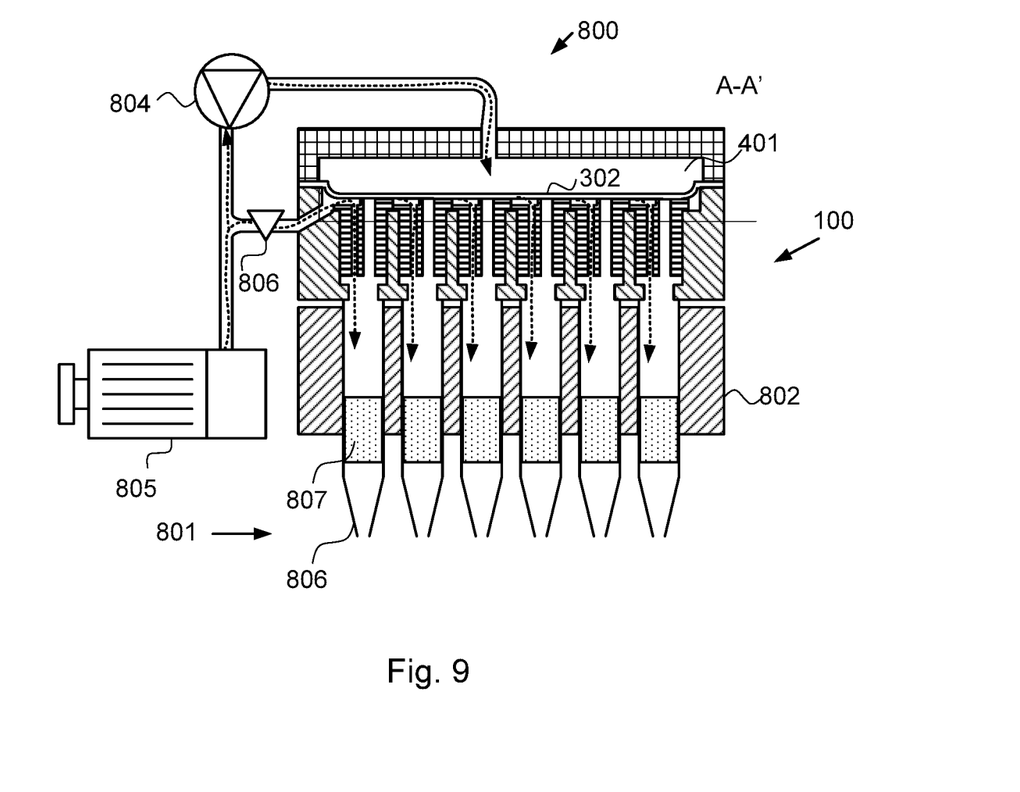
FIG. 9 is a schematic view of a system according to the present invention.
Figure 10:
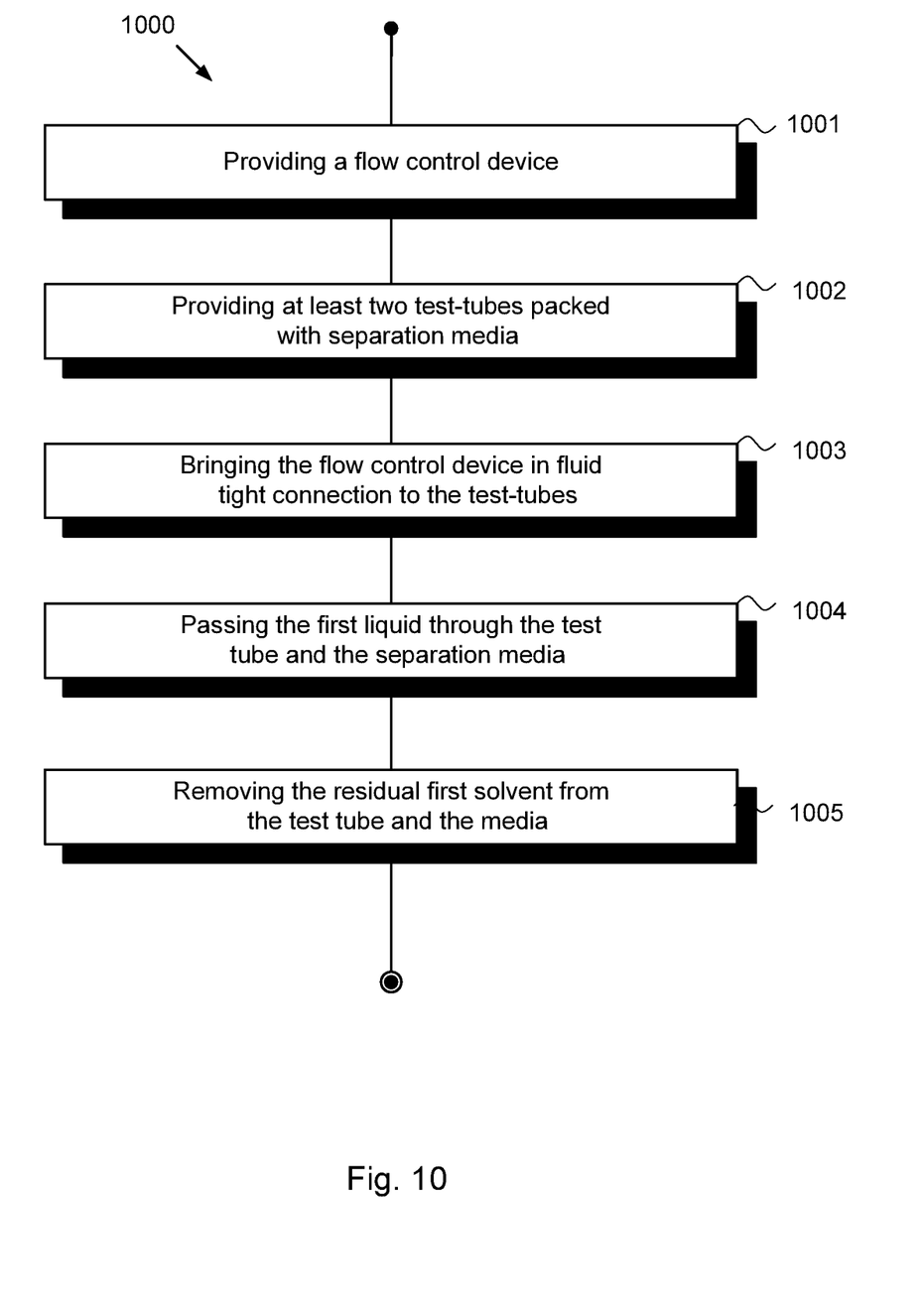
FIG. 10 is a flow diagram illustrating a method according to the present invention.

In FIG. 9, the membrane of the flow control device 100 is in its second position. This is caused by opening the control means 804 such that compressed air flows into the cavity 401 from the manoeuvrable fluid source 805, which causes the membrane 32 to deflect and block each inlet 105 of the primary outlet. This causes the primary flow path to be interrupted and the secondary flow path is the only flow path from the manoeuvrable fluid source to each test-tube 806 of the array 801. This causes a reduced flow of fluid from the manoeuvrable fluid source to the test-tubes of the array 801. This reduced flow is suitable for moving a liquid through the test tubes.

The system disclosed in FIGS. 8 and 9 allows a novel method for separating at least one target molecule from a first liquid to be formulated.

Thus, a further aspect of the present invention is a method of separating a target molecule, such as an organic molecule, e.g. a biomarker, from a liquid. More specifically, a method according to the invention may be a stage of a separation method, wherein the solvent of the target molecule is changed. This is advantageous for many reasons, one of which being to move the target an aqueous liquid, such as a biological sample, into an organic solvent suitable for subsequent steps of detection thereof. A commonly used method for sample preparation before detection is solid phase extraction (SPE). However, as the skilled person will appreciate, the present invention has a broader applicability in other separation schemes such as supported liquid extraction (SLE) and chromatographic methods.

Thus, in one embodiment, the method for changing the solvent during solid phase extraction (SPE) comprises:

a) providing a set of flow control devices arranged in fixed relationship to each other, wherein each device is provided with a primary flow path and a secondary flow path, and wherein the primary flow path has a lower flow resistance compared to the secondary flow path;

b) providing at least two test tubes comprising separation media and arranged in a fixed relationship to each other in an array, wherein in each test-tube, target molecule (s) have adsorbed to the separation media in the presence of a first solvent;

c) bringing the flow control devices in substantially fluid tight connection to the test tubes in the array, such that the respective outlets from each device is connected to a separate test tube in the array;

d) passing a first fluid via the flow control devices through the first and the secondary flow paths and through each test tube to remove residual first solvent from the separation media;

e) blocking the primary flow paths by applying a displaceable element such as a single membrane to the respective inlets thereof and adding a second solvent to each test tube via the secondary flow path.

In one embodiment, the method involves one or more additional steps, such as a step of eluting the target molecules.

For the purpose of changing solvent, the first liquid is commonly immiscible with the second liquid.

Thus, in an illustrative embodiment, the first fluid is advantageously air, such as pressurized air, used to flush the media free or substantially free of the first solvent, which is often aqueous for biological samples. The second liquid may then be a substantially nonpolar solvent, such as an organic solvent commonly used in the area and preferably known to be compatible with sensitive instruments for the detection of target molecules. Thus, the second solvent may be dichloromethane or hexane.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A flow control device, the flow control device comprising:

a displaceable element; and a body comprising a first cavity in fluid contact with a first side of the displaceable element and a first inlet connected to the first cavity, and a plurality of holes, wherein the displaceable element is shared by the plurality holes, wherein the plurality of holes defines a longitudinal axis, and each of the plurality of holes includes an upper opening, the displaceable element extending across the entirety of the upper opening, a primary outlet with a primary flow resistance, wherein the primary outlet is configured to form a first fluid path with the first inlet and comprises a first inlet opening at a first level facing the first side of the displaceable element, and a secondary outlet with a secondary flow resistance, wherein the secondary outlet is configured to form a second fluid path with the first inlet and comprises a second inlet opening at a second level, the second level different from the first level, and wherein the displaceable element is configured to move along the longitudinal axis between a first position and a second position, such that in the first position, the first fluid path between the first inlet and the primary outlet is provided, and the second fluid path between the first inlet and the secondary outlet is provided, and in the second position, the displaceable element closes the first inlet opening of the primary outlet, whereby the first inlet opening is blocked, and the second fluid path between the first inlet and the secondary outlet is maintained.

2. The device according to claim 1, further comprising:
a lid with a second inlet, the lid forming a second cavity,
    wherein the displaceable element is arranged between the lid and the body,
    wherein the second cavity is in fluid contact with a second side of the displaceable element, and
wherein the displaceable element is movable to the second position by fluid under pressure provided to the second inlet.

3. The device according to claim 2, wherein the displaceable element of each device is a membrane, wherein the first position of the displaceable element corresponds to a flat state of the membrane.

4. The device according to claim 1, wherein in each hole, the primary flow resistance is different from the secondary flow resistance.

5. The device according to claim 1, wherein in each hole, the primary outlet, or the secondary outlet, or both the primary outlet and the secondary outlet are provided with flow restricting means.

6. The device according to claim 5, wherein the flow restricting means includes a tube having a defined through-bore.

7. The device according to claim 5, wherein the flow restricting means is an amorphous material with a defined fluid flow resistance.

8. The device according to claim 1,
wherein the body further comprises a separate restrictor housing included in each of the plurality of holes, and
wherein, the primary outlet and the secondary outlet are arranged in the separate restrictor housing.

9. The device according to claim 8, wherein each restrictor housing comprises:
an elongated body with the primary outlet and the secondary outlet extending along a longitudinal axis of an elongated axis; and
a flange arranged at a proximal end of the elongated body;
wherein the elongated body at the proximal end further comprises:
    a seat, including the first inlet opening, for the primary outlet, wherein the seat is configured to provide a seal when engaged with the displaceable element in the second position of the displaceable element, the seat is further configured to provide the first fluid path through the primary outlet when the displaceable element is in the first position,
    an inlet, including the second inlet opening, for the secondary outlet arranged at a longitudinal distance from the seat, wherein the secondary outlet is open both in the first position and the second position of the displaceable element.

10. The device according to claim 9, wherein the seat in is a planar surface with a normal parallel to the longitudinal axis of the elongated body.

11. The device according to claim 9, wherein the second inlet opening for the secondary outlet comprises a groove in a proximal end surface of the elongated body, wherein the groove is configured to provide a fluid path to the secondary outlet from the inlet when the displaceable element is in the second position.

12. The device according to claim 1, wherein each hole is configured to be connected to a separate opening of at least one of a test-tube, wells of a multiwell plate, or vials or columns of a rack.

13. A system, comprising:
a flow control device, comprising:
    a displaceable element;
    a body comprising a first cavity in fluid contact with a first side of the displaceable element forming a first volume and a first inlet connected to the first volume, and a plurality of holes sharing the displaceable element,
    wherein, the plurality of holes defines a longitudinal axis, and for each of the plurality of holes,
        an upper opening, the displaceable element extending across the entirety of the upper opening,
        a primary outlet with a primary flow resistance, wherein the primary outlet is configured to form a first fluid path with the first inlet and comprises a first inlet opening at a first level facing the first side of the displaceable element, and a secondary outlet with a secondary flow resistance,
        wherein the secondary outlet is configured to form a second fluid path with the first inlet and comprises a second inlet opening at a second level, the second level different from the first level,
    wherein the displaceable element is configured to move long the longitudinal axis between a first position and a second position such that
        in the first position, the first fluid path between the first inlet and the primary outlet is provided, and the second fluid path between the first inlet and the secondary outlet is provided, and
        in the second position, the displaceable element closes the first inlet opening of the primary outlet, whereby the first inlet opening is blocked, and the second fluid path between the first inlet and the secondary outlet is maintained;
an array of test-tubes arranged on a carrier such that a proximal open end of the test-tube are in a fluid tight connection with the flow control device such that corresponding primary flow path and secondary flow path of the flow control device opens into a proximal open end of each test-tube;
a controller configured to control the movement of the displaceable element of the flow control device; and
a manoeuvrable fluid source connected to the first inlet for supplying a first fluid.

14. The system according to claim 13, wherein the first fluid is a compressed gas.

15. The system according to claim 13, wherein the controller for the displaceable element is a valve.

* * * * *